UNITED STATES PATENT OFFICE.

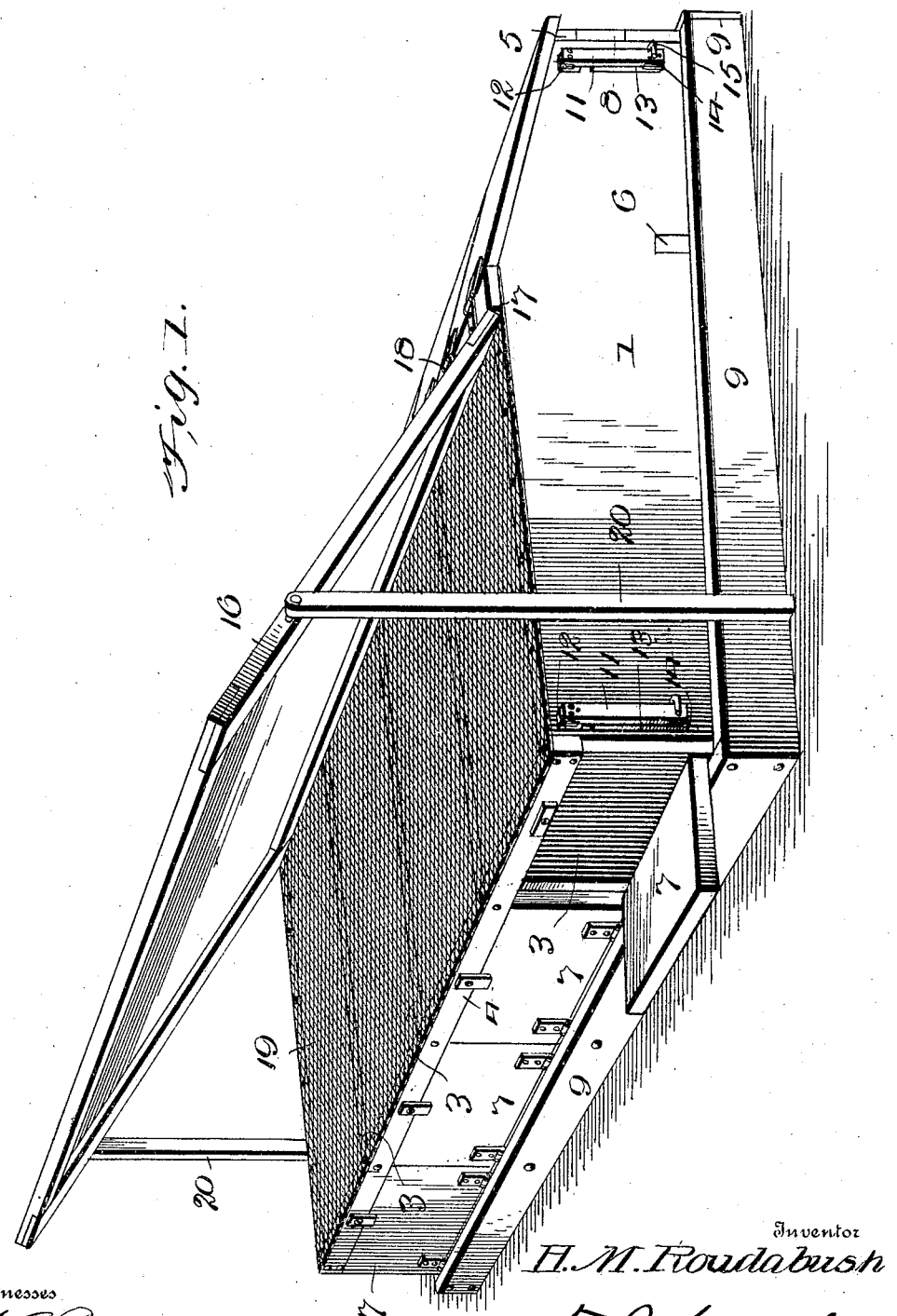

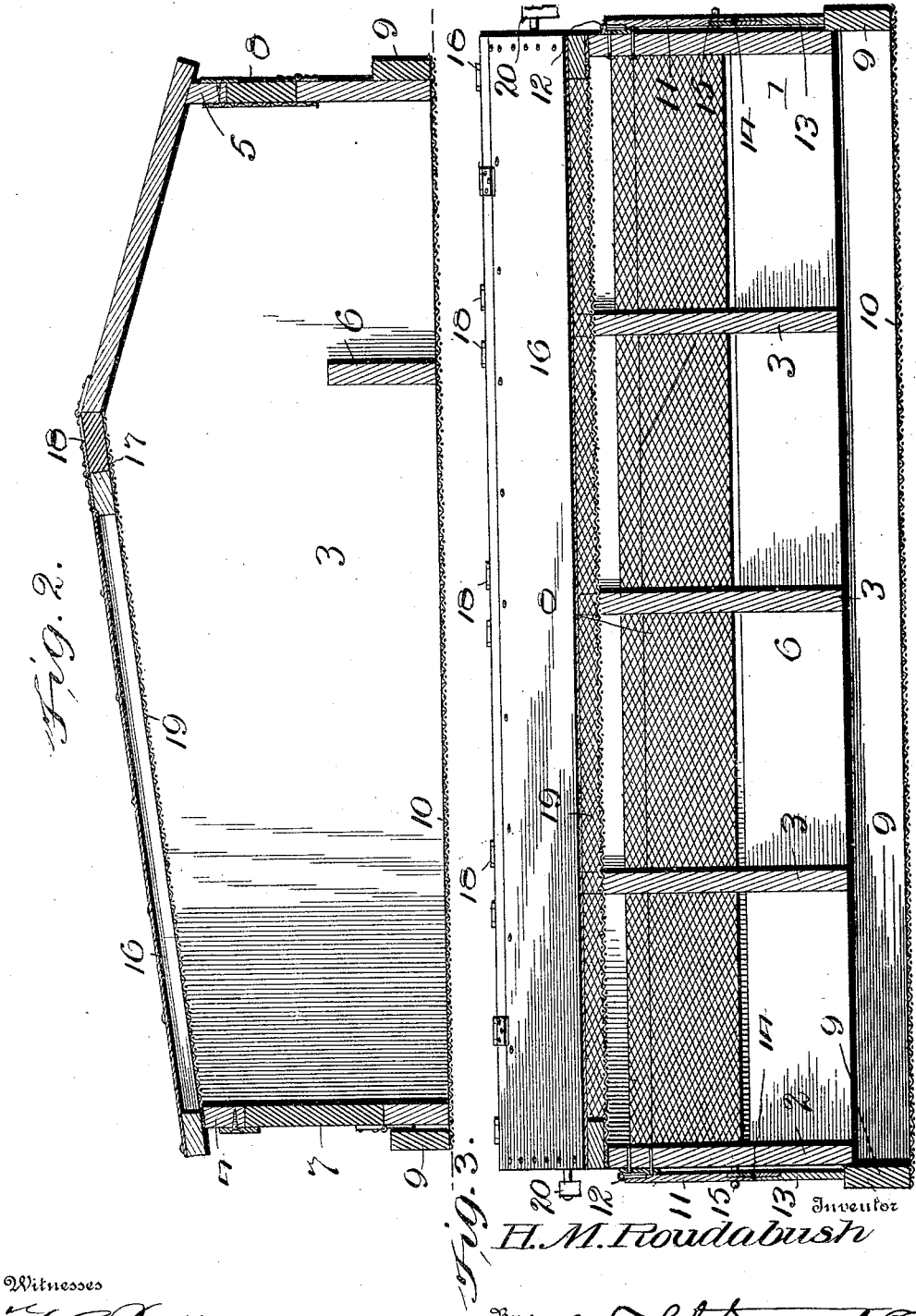

HIRAM M. ROUDABUSH, OF PENN LAIRD, VIRGINIA, ASSIGNOR TO MARY C. ROUDABUSH.

DEVICE FOR USE IN POULTRY CULTURE.

No. 806,918.     Specification of Letters Patent.     Patented Dec. 12, 1905.

Application filed March 21, 1905. Serial No. 251,252.

*To all whom it may concern:*

Be it known that I, HIRAM M. ROUDABUSH, a citizen of the United States, residing at Penn Laird, in the county of Rockingham and State of Virginia, have invented certain new and useful Improvements in Devices for Use in Poultry Culture; and I do hereby declare the following to be a full, clear, and exact description of the invention, such as will enable others skilled in the art to which it appertains to make and use the same.

My invention relates to a device for use in poultry culture, and more particularly to a coop, whereby the mother hen may be employed to hatch the eggs; and my invention consists of certain novel features of construction and combination of parts the preferred form whereof will be hereinafter clearly set forth, and pointed out in the claim.

The prime object of my invention is to utilize the mother hen to carry on the process of incubation and house and protect her, so that she will be undisturbed.

A further object is to provide a housing suitable for a number of hens and from which may be readily improvised a brooding-chamber or housing for accommodating a hen or a number of hens and the newly-hatched chickens.

Other objects and advantages will be hereinafter made clearly apparent, reference being had to the accompanying drawings, which are made a part of this application, and in which—

Figure 1 shows a perspective view of my invention complete ready for use. Fig. 2 shows a transverse sectional view thereof, said line of division being longitudinal with one of the compartments. Fig. 3 is a detail view showing the upper portion of the housing raised and supported relative to the base portion, whereby all of the individual compartments may be thrown into one chamber to accommodate all of the hens and the young chickens, as desired.

For convenience of reference the various details of my invention and coöperating accessories will be designated by numerals, the same numeral applying to a similar part throughout the several views.

In carrying out my invention I provide a suitable framework comprising the side sections 1 and 2 and intermediate sections 3, there being any desired number of compartments formed, according to the number of intermediate compartments employed. The sections 1 and 2 and the intermediate sections 3 are connected together at their ends by the walls 4 and 5, while running transversely across the end of each of the compartments formed by the walls 1 and 2 and partitions 3 is a dividing-wall 6 of a proper height to provide a nest-compartment between the dividing-wall 6 and an outer wall 5. The nest is therefore placed in the small compartment thus formed, the remainder of the compartment between the wall 1 or 2 and the next partition-wall 3 being left to permit the hen to move about therein, as while being fed, access being rendered to the compartments, as designated by the door 7.

A door 8 is provided in one wall of the device, and by means thereof the compartments may be thoroughly ventilated. The interior of the coop can also be readily seen therethrough. I also provide a base member comprising the frame-sections 9, secured together at their ends, so as to fit around the bottom of the assembled nesting-compartments, as clearly shown in Fig. 1. The base member is provided on its lower side with a wire-netting 10 of suitable material to prevent corrosion and rust, the object of the wire-netting being to prevent rodents and the like from burrowing under the base member and gaining access to the interior of the nesting-compartment.

It becomes desirable to elevate the nesting-compartment, and as there is no bottom in the said compartment it follows that the base member will leave all of the hens and young chicks occupying the several nesting-compartments to be unseparated or occupy in common the entire interior, and in order to hold the nesting-compartment in an elevated position I provide suitable supporting-legs therefor and comprising the member 11, pivotally secured, as by the hinge 12, near the upper edge of a nesting-compartment and having hinged to its free end an auxiliary member or leg 13, a suitable hinge 14 being employed for this purpose, and it therefore follows that when the members 11 and 13 are extended and dropped downward the lower end of the member 13 will rest directly upon a contiguous part of the edge of the frame-section 9 of the base member, and will therefore reliably support the nesting-compartment in an elevated position. When the supporting-legs are not in use, the member 12 can be folded up on the inner side of the member 11, this being permitted because the hinge of the member 12 is spaced from the wall of the nesting-compartment, and both of said members thus disposed closely in engagement with the wall of the nesting-compartment, and in order that said parts may be secured I provide the turn-pin or keeper 15, secured to a contiguous part of the wall. When, therefore, the leg-sections 11 and 13 are extended or folded, this turn-pin 15 may be readily adjusted to hold said parts in place. I also provide for the top of the nesting-sections a suitable lid 16, hinged to the cross-bar 17, as designated by the numeral 18, and said lid or closure 16 may be folded directly downward over the covering of meshed wire 19, so as to darken the interior and keep out the rain. The closure-section 16, however, may be readily sustained in an open position by the leg 20, the lower end of which may be disposed upon the ground when the closure is opened to the desired extent.

It will thus be seen that I have provided a very efficient device for grouping together a number of hens and affording the hens a safe housing and isolation necessary to enable them to uninterruptedly perform their work, and believing that the advantages and manner of constructing and using my appliance have thus been made clearly apparent further description is deemed unnecessary.

Having thus fully described my invention, what I claim as new, and desire to secure by Letters Patent, is—

The herein-described housing or nesting compartment comprising the housing proper divided into a plurality of nesting-chambers and runways; a base-section loosely receiving the lower end of said nesting-compartment and suitable supporting-legs carried by the nesting-compartment and adapted to rest upon the base member whereby the nesting-compartment may be held in an elevated position and means to lock said supporting-legs in a folded or extended position all combined substantially as specified and for the purpose set forth.

In testimony whereof I have signed my name to this specification in the presence of two subscribing witnesses.

HIRAM M. ROUDABUSH.

Witnesses:
 Ed. C. Maetz,
 A. U. Lewis.